United States Patent
Hayashi

(10) Patent No.: US 10,877,709 B2
(45) Date of Patent: Dec. 29, 2020

(54) IMAGE PROCESSING APPARATUS, NON-TRANSITORY RECORDING MEDIUM STORING IMAGE PROCESSING PROGRAM, AND IMAGE PROCESSING METHOD FOR GENERATING A COLOR CHART IMAGE DATA

(71) Applicant: SEIKO EPSON CORPORATION, Tokyo (JP)

(72) Inventor: Ryotaro Hayashi, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 16/566,541

(22) Filed: Sep. 10, 2019

(65) Prior Publication Data
US 2020/0081673 A1  Mar. 12, 2020

(30) Foreign Application Priority Data
Sep. 11, 2018 (JP) .................. 2018-169417

(51) Int. Cl.
*G06F 3/12* (2006.01)

(52) U.S. Cl.
CPC .......... *G06F 3/1256* (2013.01); *G06F 3/1208* (2013.01)

(58) Field of Classification Search
None
See application file for complete search history.

(56) References Cited

U.S. PATENT DOCUMENTS

2016/0041488 A1* 2/2016 Matsuoka .............. G03G 15/01
399/15

FOREIGN PATENT DOCUMENTS

JP 2007-176025 7/2007

\* cited by examiner

*Primary Examiner* — Thomas D Lee
(74) *Attorney, Agent, or Firm* — Workman Nydegger

(57) ABSTRACT

An image processing apparatus includes a processor that generates color chart image data representing a color chart containing a plurality of patches and causes a printing apparatus to print the color chart based on the generated color chart image data, and the processor generates the color chart image data representing the color chart in which the amounts of recording agents having colors that belong to a first color group are fixed among the patches and the amount of a recording agent having a specific color that does not belong to the first color group varies among the patches.

6 Claims, 5 Drawing Sheets

IMAGE PROCESSING APPARATUS, NON-TRANSITORY RECORDING MEDIUM STORING IMAGE PROCESSING PROGRAM, AND IMAGE PROCESSING METHOD FOR GENERATING A COLOR CHART IMAGE DATA

The present application is based on, and claims priority from JP Application Serial Number 2018-169417, filed Sep. 11, 2018, the disclosure of which is hereby incorporated by reference herein in its entirety.

BACKGROUND

1. Technical Field

The present disclosure relates to an image processing apparatus, a non-transitory recording medium storing an image processing program, and an image processing method.

2. Related Art

There is a known technology for causing a color chart containing a plurality of adjacent patch images having different colors, cyan, magenta, yellow, and black (CMYK), to be printed on a sheet by using a printer with a maximum applied amount of printing agent set in advance (see JP-A-2007-176025).

In a color chart of the related art, a user can check only the color tone of the patches resulting from recording agents used in color printing, such as CMYK inks, and cannot check the degree of any visual effect other than the color tone in the result of the printing.

SUMMARY

An image processing apparatus includes a controller that generates color chart image data representing a color chart containing a plurality of patches and causes a printing apparatus to print the color chart based on the generated color chart image data, and the controller generates the color chart image data representing the color chart in which amounts of recording agents having colors that belong to a first color group are fixed among the patches and an amount of a recording agent having a specific color that does not belong to the first color group varies among the patches.

DESCRIPTION OF EXEMPLARY EMBODIMENTS

An embodiment of the present disclosure will be described below with reference to the drawings. The drawings are merely an example for describing the present embodiment.

1. Overall Description of System

Figure 1:
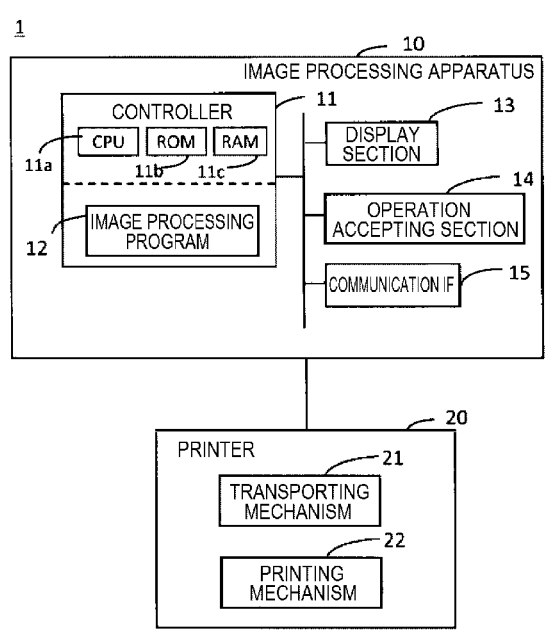
FIG. 1 shows a schematic configuration of a system.

FIG. 1 shows the configuration of a system 1 according to the present embodiment in a simplified manner. The system 1 includes an image processing apparatus 10 and a printer 20. The system 1 may instead be called, for example, an image processing system or a printing system.

The image processing apparatus 10 is achieved, for example, in the form of a personal computer, a smartphone, a tablet terminal, or an information processing apparatus having processing performance comparable to the processing performance of any of the apparatuses described above. The image processing apparatus 10 includes a controller 11, a display section 13, an operation accepting section 14, a communication interface 15, and other components. The interface is abbreviated to IF. The controller 11 includes one or more ICs including a CPU 11$a$ as a processor, a ROM 11$b$, a RAM 11$c$, and other nonvolatile memories.

In the controller 11, the processor, that is, the CPU 11$a$ controls the image processing apparatus 10 by using, for example, the RAM 11$c$ as a work area to carryout computation processes according to a program saved in the ROM 11$b$ or any other memory. The controller 11 carries out a process according, for example, to an image processing program 12. The processor is not limited to a single CPU and may be so configured that a plurality of CPUS or a hardware circuit, such as an ASIC, carries out a process or the CPU carries out a process in cooperation with a hardware circuit.

The display section 13 is a section for displaying visual information and is formed, for example, of a liquid crystal display or an organic EL display. The display section 13 may include a display and a drive circuit for driving the display. The operation accepting section 14 is a section for accepting a user's operation and is achieved, for example, by physical buttons, a touch panel, a mouse, a keyboard, or any other component. The touch panel may, of course, be achieved as a function of the display section 13. The display section 13 and the operation accepting section 14 can be collectively called an operation panel of the image processing apparatus 10.

The display section 13 and the operation accepting section 14 may each be part of the configuration of the image processing apparatus 10 or a peripheral instrument externally coupled to the image processing apparatus 10. The communication IF 15 is a collective name of one or more IFs for performing communication with an external apparatus via a wire or wirelessly in conformity with a predetermined communication protocol including any of known communication standards. The controller 11 communicates with the printer 20 via the communication IF 15.

The printer 20 generally includes a transporting mechanism 21, a printing mechanism 22, and other components. The transporting mechanism 21 transports a print medium along a predetermined transportation direction. The print medium is typically a sheet of paper and may instead, for example, be a film, a medium or any other object for textile printing, or a material other than paper. The printing mechanism 22 performs printing based on image data, for example, in an ink jetting or electronic photographic process on the print medium transported by the transporting mechanism 21. The printing mechanism 22 performs the printing by attaching color recording agents onto the print medium based on the image data. In the following description, a recording agent used by the printer 20 is termed ink, and the term "ink" may be replaced, for example, with a term "toner."

In the present embodiment, the printing mechanism 22 of the printer 20 can use inks having colors that belong to a first color group used in color printing and an ink having a specific color that does not belong to the first color group to perform the printing. The ink having a specific color is termed a specific-color ink. The first color group is typically formed of CMYK. In a case where the printer 20 is a product model using light cyan, light magenta, gray, orange, green, purple, brown, and other color inks as well as CMYK inks, the additional colors described above also belong to the first color group. The description will resume on the assumption that the printer 20 is a product model using CMYK inks as the first color group in the printing. The specific-color ink is an ink for providing a visual effect that is not provided by only the inks having the colors that belong to the first color group and is, for example, what is called a white ink, a metallic-color ink, or a clear ink. A metallic-color ink is abbreviated to a metallic ink.

The image processing apparatus 10 and the printer 20 may be coupled to each other via a network that is not shown. The printer 20 may be a multifunction machine having a plurality of functions including not only the printing function but the function as a scanner, the facsimile communication function, and other functions. The image processing apparatus 10 may be achieved by a single independent information processing apparatus or may instead be achieved by a plurality of information processing apparatuses communicably coupled to each other via the network.

Instead, the image processing apparatus 10 and the printer 20 may be integrated with each other into a unitary apparatus. That is, the image processing apparatus 10 may be taken as an apparatus that is part of the configuration contained in the printer 20, and the processes described below and carried out by the image processing apparatus 10 may be taken as processes carried out by the printer 20.

2. First Embodiment

A first embodiment embodied in the system 1 will next be described.

Figure 2:
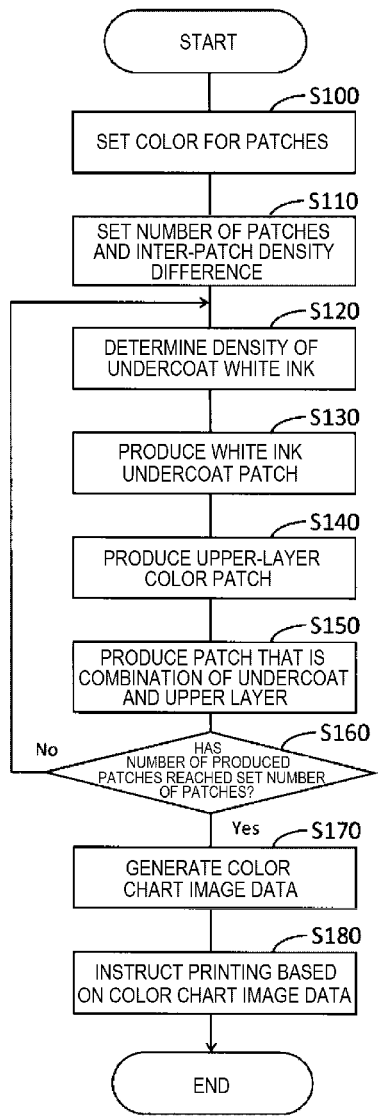
FIG. 2 is a flowchart showing a color chart print control process in a first embodiment.

FIG. 2 shows, in the form of a flowchart, a color chart print control process according to the first embodiment and achieved by the controller 11 in accordance with an image processing program 12. At least part of the steps shown in FIG. 2 shows process steps of an image processing method. The color chart print control process allows the printer 20 to print a color chart on a print medium.

In step S100, the controller 11 sets a color for patches that form the color chart. In this case, the controller 11 causes the display section 13 to display a first user interface screen for accepting the specified color for the patches from the user. The user interface is abbreviated to UI. The user operates the operation accepting section 14 to specify the color for the patches via the first UI screen. The user specifies the color, for example, in the form of a value in a predetermined colorimetric system, such as the L*a*b* colorimetric system and the CMYK colorimetric system.

The controller 11 sets the color specified via the first UI screen as the color for the patches. The color for the patches set in step S100 is a color common to the patches in the color chart to be printed by the printer 20. The color set in step S100 is reproduced on the print medium by the CMYK inks as the first color group.

In step S110, the controller 11 sets the number of patches that form the color chart and an inter-patch density difference. The inter-patch density difference set in step S110 is a difference in density of the specific-color ink. In the first embodiment, the specific-color ink refers to a white ink. In the first embodiment, the specific-color ink is printed, on the print medium, as an undercoat for the CMYK inks to be printed to reproduce the color set in step S100.

The controller 11 causes the display section 13 to display a second UI screen for accepting the specified number of patches and inter-patch density difference from the user. For example, the first UI screen and the second UI screen are different screens, and the user switches the first UI screen to the second UI screen and vice versa via the display section 13. The first UI screen and the second UI screen may instead be the same screen and is so designed that the color for the patches, the number of patches, and the inter-patch density difference specified by the user are accepted in the same screen.

The user operates the operation accepting section 14 to specify the number of patches and the inter-patch density difference via the second UI screen. The controller 11 accepts the following specified parameters as an example via the second UI screen: the number of patches=9; and the inter-patch density difference=10%. The controller 11 sets the parameters specified via the second UI screen as the number of patches and the inter-patch density difference.

The user may specify a center density via the second UI screen in addition to the number of patches and the inter-patch density difference. For example, assume that the user has specified the following parameters via the second UI screen: the number of patches=5; the inter-patch density difference=10%, and the center density=50%. In this case, the controller 11 sets operation of printing the following 5 patches in total: a patch having a density of the specific-color ink set at the center density of 50%; patches having densities of the specific-color ink set at 40% and 30%, which are lower than the center density; and patches having densities of the specific-color ink set at 60% and 70%, which are higher than the center density.

Instead, the user may specify only one of the number of patches and the inter-patch density difference via the second UI screen.

For example, when the user sets the number of patches via the second UI screen, the controller 11 sets the specified number of patches as the number of patches in the color chart. The controller 11 can then set, as the inter-patch density difference, a density width of a segment unit that is the result of division of the range from the lowest density (0%) to the highest density (100%) of the specific-color ink by the set number of patches.

In a case where the user specifies the inter-patch density difference via the second UI screen, the controller 11 sets the specified inter-patch density difference as the inter-patch density difference. The controller 11 can then set the number of patches in accordance with the number of segments that is the result of division of the range from the lowest density (0%) to the highest density (100%) of the specific-color ink by the set inter-patch density difference.

In either case, the controller 11 only needs to set the number of patches and the inter-patch density difference in step S110 in accordance with the user's instruction.

In step S120, the controller 11 determines the density of the undercoat white ink for one of the patches that form the color chart. In this case, the controller 11 determines the density of the white ink for the patch that forms the color chart in accordance with the setting made in step S110. For example, when the number of patches=9 and the inter-patch density difference=10% are set, the controller 11 determines the density of the white ink to be 10% for one of the 9 patches that is the patch having the lowest density of the white ink.

In step S130, the controller 11 produces a white ink patch having the density determined in step S120. Producing a white ink patch is producing an image representing the white ink patch and having a predetermined patch size. For example, the controller 11 normalizes the white ink density determined in step S120 into a grayscale value within a predetermined grayscale range (256-grayscale range from 0 to 255, for example) and produces, as the white ink patch, an image that is a set of a plurality of pixels having the grayscale value of the normalized white and has the patch size described above. The white is also termed "W."

In step S140, the controller 11 produces a color patch for the one patch that forms the color chart. Producing a color patch is producing an image representing the color set in step S100 and having the patch size described above. The controller 11 converts or otherwise changes the value representing the color set in step S100 as required from the color in the L*a*b* colorimetric system into the color in the CMYK colorimetric system to produce pixels having a grayscale value for each of the colors that belong to the first color group, that is, CMYK. The controller 11 then produces, as a color patch, images that are each a set of a plurality of produced pixels having the grayscale value of for each of CMYK and has the patch size described above. The color patch is an upper-layer image above the white ink patch as the undercoat.

In step S150, the controller 11 produces one patch that is the combination of the white ink patch produced in step S130 and the color patch produced in step S140. That is, the controller 11 produces an image that is a set of a plurality of pixels having the grayscale values of CMYKW and has the patch size described above. The patch produced in step S150 corresponds to one patch that forms the color chart.

In step S160, the controller 11 evaluates whether or not the number of patches produced in the processes down to step S150 has reached the number of patches set in step S110. In a case where the number of produced patches has not reached the number of patches set in step S110, the controller 11 determines that the result of the evaluation is "No" and returns to step S120, whereas when the number of produced patches has reached the number of patches set in step S110, the controller 11 determines that the result of the evaluation is "Yes" and proceeds to step S170.

In step S120 to which the controller 11 proceeds after the determination of "No" in step S160, the controller 11 determines the density of the undercoat white ink in accordance with the setting made in step S110 for one new patch that forms the color chart. The controller 11, of course, determines a density different from the density determined in previous step S120 as the density of the undercoat white ink. For example, when the controller 11 has set the number of patches=9 and the inter-patch density difference=10%, and the controller 11 has determined the density of the white ink to be 10% in previous step S120, the controller 11 determines the density of the white ink to be 20% in the current step S120.

Having repeated the processes in steps S120 to S150 by the number equal to the number of patches set in step S110, the controller 11 determines the result of the evaluation in step S160 to be "Yes". During the repeated processes in step S120 to S150, the white ink patch produced whenever the process in step S130 is carried out is an image having a density different from the densities of the images of other white ink patches, but the color patch produced whenever the process in step S140 is carried out is a fixed image.

In step S170, the controller 11 generates color chart image data.

Figure 3:
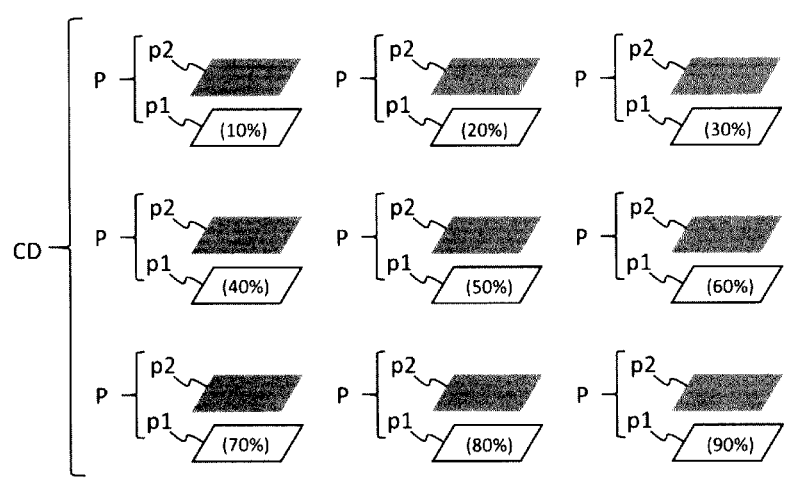
FIG. 3 shows color chart image data.

FIG. 3 diagrammatically shows color chart image data CD generated in step S170. In the example shown in FIG. 3, the color chart image data CD contains 9 patches P. The patches P each have a quadrangular shape in the example shown in FIG. 3 and may each instead have a circular shape or any other shape. One such patch is produced whenever the processes in steps S120 to S150 are carried out once. The controller 11 produces the color chart image data CD, which is, for example, an image in which the plurality of patches P are arranged at predetermined intervals in the horizontal and vertical directions at the timing when the result of the evaluation in step S160 shows "Yes."

In FIG. 3, the patches P are each separated into patches p1 and p2 for ease of understanding. That is, the patch p1 contained in each of the patches P represents the white ink patch produced in step S130, and the patch p2 represents the color patch produced in step S140. As understood from the above description, the color patches p2 in the patches P are the same image, and the white ink patches p1 in the patches P are images different from one another. The situation in which the images are the same can be taken as a situation in which the same amounts of inks are used to print the images, whereas the situation in which the images differ from one another can be taken as a situation in which different amounts of inks are used to print the images. In FIG. 3, the white ink patches p1 are each labeled with the white ink density in parentheses as additional information for ease of understanding. As described above, the color chart image data generated in step S170 represents a color chart in which the amounts of CMYK inks, which are inks of the first color group, are the same among the patches P and the amount of white ink, which is the specific-color ink, varies among the patches P.

Step S170 corresponds to a generation process step of generating the color chart image data. It is, however, noted that the processes in step S100 to S170 as a whole may be so taken as to correspond to the generation process step of generating the color chart image data. In step S170, the controller 11 generates the color chart image data containing printing order instruction information representing that the white ink should be first printed as the undercoat and the CMYK inks should be printed on the undercoat.

In step S180, the controller 11 instructs the printer 20 to print the color chart based on the generated color chart image data. Step S180 corresponds to a print control process step. In this case, the controller 11 transmits a print command containing the color chart image data to the printer 20 via the communication IF 15. The print command is a print execution instruction based on the color chart image data.

The printer 20 receives the print command containing the color chart image data and prints the color chart on the print medium. In this process, the printer 20 converts or otherwise changes as appropriate the color chart image data into halftone data that stipulates dot recording/non-recording on a pixel basis and on a CMYKW ink basis to generate image data in the form that can be used by the printing mechanism 22 to record the CMYKW inks. The printer 20 then causes the printing mechanism 22 to perform printing based on the image data that can be used by the printing mechanism 22 to perform the recording and the print order instruction information described above. Any conversion process necessary for generating image data that can be used by the printing mechanism 22 to perform the recording, such as the above-mentioned conversion into halftone data, may be carried out by the image processing apparatus 10.

The printer 20 prints the undercoat (patch p1) for each of the patches P with the white ink on the print medium and prints the upper layer (patch p2) for each of the patches P with the CMYK inks in the position where the undercoat has been printed in such a way that the upper layer is superimposed on the undercoat, achieving a state in which the color chart containing the plurality of patches P has been printed. A specific multilayer printing method for printing a plurality of image layers, such as the undercoat and the upper layers on the undercoat, in a superimposed manner may be any method. The printer 20 achieves the multilayer printing according to the print order described above, for example, by scanning a fixed region of the print medium multiple times with a carriage that incorporates a print head capable of discharging inks. The printer 20 may instead achieve the multilayer printing by causing the transporting mechanism 21 to feed the print medium on which the undercoat has been printed back toward the upstream of the transport path, transporting the print medium toward the downstream of the transport path again, and causing the printing mechanism 22 to print the CMYK inks on the re-transported print medium.

3. Second Embodiment

A second embodiment embodied in the system 1 will next be described.

Figure 4:
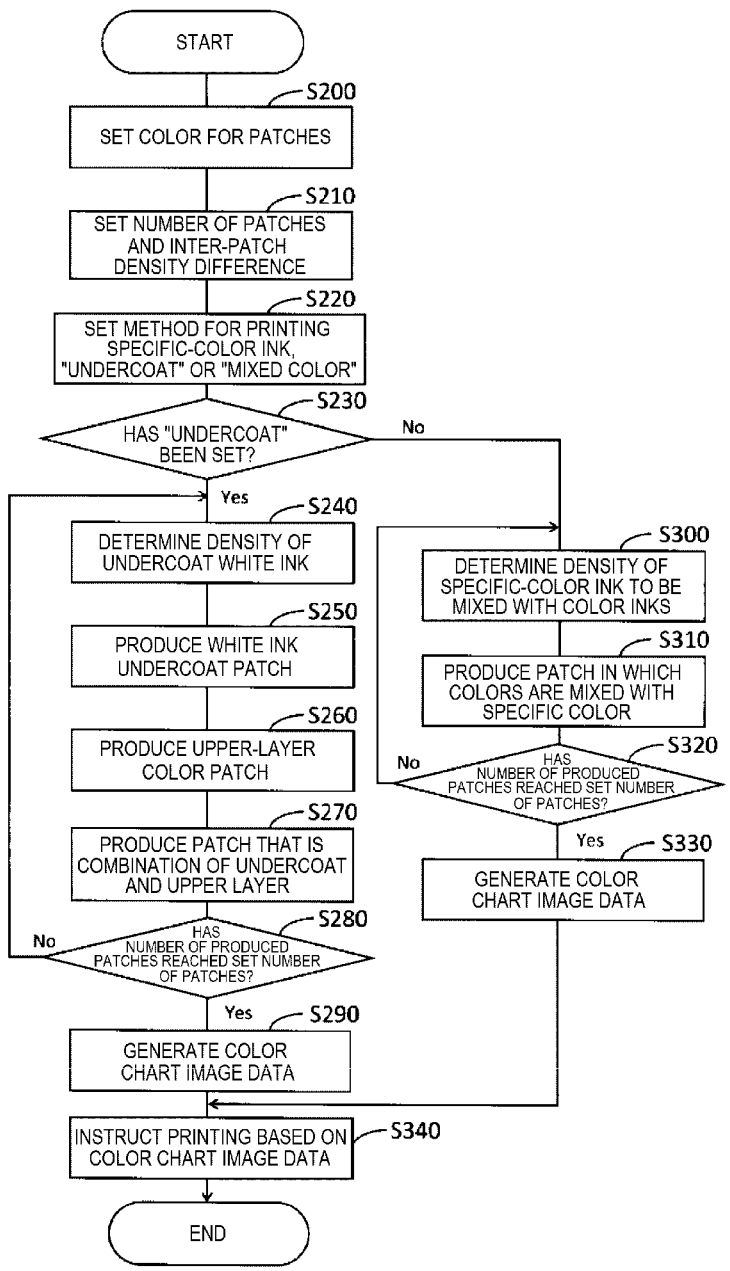
FIG. 4 is a flowchart showing the color chart print control process in a second embodiment.

FIG. 4 shows, in the form of a flowchart, the color chart print control process according to the second embodiment and achieved by the controller 11 in accordance with the image processing program 12. At least part of the steps shown in FIG. 4 shows process steps of the image processing method. The second embodiment will be described about points different from those in the first embodiment.

Processes in steps 200 and 210 are the same as those in steps S100 and S110 and will therefore not be described. In the second embodiment, however, the specific-color ink is not limited to a white ink. In the second embodiment, the specific-color ink refers to a white ink or a metallic ink. The metallic color is also termed "Mt."

In step S220, the controller 11 sets a method for printing the specific-color ink. The method for printing the specific-color ink is classified into "undercoat printing" and "mixed-color printing." The undercoat printing has been described in the first embodiment and is a method for printing a white ink as the undercoat before printing CMYK inks. On the other hand, the mixed-color printing is a method for printing the specific-color ink at a timing similar to the timing when the CMYK inks are printed instead of printing the specific-color ink as the undercoat for the CMYK inks.

Printing the specific-color ink at a timing similar to the timing when the CMYK inks are printed does not mean that the specific-color ink and the CMYK inks are printed at the completely same timing on a region corresponding to one patch on the print medium. The timings when a plurality of color inks are printed on a region corresponding to one patch on the print medium typically shift from one another. The mixed-color printing therefore has, for example, an aspect in which the CMYK inks and the specific-color ink are discharged in a common scan period in the course of scanning a region of the print medium with the carriage and an aspect in which the CMYK inks and the specific-color ink are printed on the same region of the print medium without the above-mentioned backward feeding of the print medium. In another point of view, in the undercoat printing, the specific-color ink is always first printed and the CMYK inks are then printed on a region corresponding to one patch on the print medium, whereas in the mixed-color printing, at least part of the CMYK inks is printed before the specific-color ink in some cases.

The controller 11 causes the display section 13 to display a third UI screen for accepting an undercoat printing instruction or a mixed-color printing instruction as the method for printing the specific-color ink from the user. The third UI screen may be a screen different from the first and second UI screens, and the user may switch the UI screen among the first, second, and third UI screens. The third UI screen may instead be substantially the same screen as the first and second UI screens. The user operates the operation accepting section to specify the undercoat printing or the mixed-color printing via the third UI screen. The controller 11 sets the method specified via the third UI screen as the method for printing the specific-color ink.

In step S230, the process carried out by the controller 11 in step 230 branches in accordance with the specific-color ink printing method set in step S220. In the case where the undercoat printing is set as the method for printing the specific-color ink, the controller 11 proceeds to step S240. On the other hand, when the mixed-color printing is set as the method for printing the specific-color ink, the controller 11 proceeds to step S300.

The processes in step S240 to S290 are the same as those in steps S120 to S170 and will not therefore be described.

In step S300, the controller 11 determines the density of the specific-color ink to be printed along with the CMYK inks in the mixed-color printing for one patch that forms the color chart. In the second embodiment, the specific-color ink to be printed along with the CMYK inks in the mixed-color printing is a metallic ink. That is, in step S300, the controller 11 determines the density of the metallic ink for the patch that forms the color chart in accordance with the number of patches and the inter-patch density difference set in step S210, as in the process of determining the density of the white ink in step S240.

In step S310, one patch in which the CMYK colors and the metallic color are mixed with each other is produced. Specifically, the controller 11 normalizes the metallic ink density determined in step S300 into a grayscale value within a predetermined grayscale range and acquires the normalized grayscale value as the grayscale value of the metallic color. The controller 11 converts or otherwise changes the value representing the color set in step S200 as required from the color in the L*a*b* colorimetric system into the color in the CMYK colorimetric system to acquire a grayscale value for each of CMYK. The controller 11 then produces an image that is a set of a plurality of pixels having the acquired grayscale values of CMYKMt and has a predetermined patch size. The image produced in step S310 as described above corresponds to one patch that forms the color chart.

In step S320, the controller 11 evaluates whether or not the number of patches produced in the processes down to step S310 has reached the number of patches set in step S210. In a case where the number of produced patches has not reached the number of patches set in step S210, the controller 11 determines that the result of the evaluation is "No" and returns to step S300, whereas when the number of produced patches has reached the number of patches set in step S210, the controller 11 determines that the result of the evaluation is "Yes" and proceeds to step S330.

In step S300 to which the controller 11 proceeds after the determination of "No" in step S320, the controller 11 determines the density of the metallic ink to be printed along with the CMYK inks in the mixed-color printing in accordance with the setting made in step S210 for one new patch that forms the color chart. The controller 11, of course, determines a density different from the density determined in previous step S300 as the density of the metallic ink. For example, when the controller 11 has set the number of patches=9 and the inter-patch density difference=10%, and the controller 11 has determined the density of the metallic ink to be 10% in previous step S300, the controller 11 determines the density of the metallic ink to be 20% in the current step S300.

Having repeated the processes insteps S300 and S310 by the number equal to the number of patches set in step S210, the controller 11 determines the result of the evaluation in step S320 to be "Yes". During the repeated processes in step S300 and S310, the patch produced whenever the process in step S310 is carried out is an image having a grayscale value of Mt different from the grayscale values of Mt of other patches, but the grayscale values of CMYK are fixed values.

In step S330, the controller 11 generates color chart image data. That is, the controller 11 produces the color chart image data, which is, for example, an image in which the plurality of patches produced in the processes down to step S310 are arranged at predetermined intervals in the horizontal and vertical directions at the timing when the result of the evaluation in step S320 shows "Yes." The color chart image data generated in step S330 represents a color chart in which the amounts of the CMYK inks, which are inks having the colors that belong to the first color group, are fixed among the patches and the amount of the metallic ink, which is the specific-color ink, varies among the patches. In step S330, the controller 11 does not contain printing order instruction information representing that the specific-color ink should be first printed as the undercoat and the CMYK inks should be printed on the undercoat in the color chart image data, unlike in step S170 or S290. In step S330, the controller 11 instead generates color chart image data containing instruction information representing that the specific-color ink and the CMYK inks should be printed in the mixed-color printing.

In step S340, the controller 11 instructs the printer 20 to print the color chart based on the generated color chart image data. When the controller 11 proceeds from step S290 to S340, the controller 11, of course, instructs the printer 20 to print the color chart based on the color chart image data generated in step S290. On the other hand, when the controller 11 proceeds from step S330 to S340, the controller 11 instructs the printer 20 to print the color chart based on the color chart image data generated in step S330. The processes carried out when the controller 11 proceeds from step S290 to S340 are those having been described in the first embodiment in relation to step S180.

When the controller 11 proceeds from step S330 to S340, the printer 20 receives the print command containing the color chart image data generated in step S330 and prints the color chart on the print medium. In this process, the printer 20 converts or otherwise changes as appropriate the color chart image data into halftone data that stipulates dot recording/non-recording on a pixel basis and on a CMYKMt ink basis to generate image data in the form that can be used by the printing mechanism 22 to record the CMYKMt inks. The printer 20 then causes the printing mechanism 22 to perform printing based on the image data that can be used by the printing mechanism 22 to perform the recording and the above-mentioned instruction information representing that the CMYKMt inks should be printed in the mixed-color printing. The printer 20 forms a patch in which the CMYKMt inks are printed in the mixed-color printing on the print medium, achieving a state in which the color chart containing the plurality of patches has been printed.

4. Overview

As described above, according to the present embodiment, the image processing apparatus 10 includes the controller 11, which generates color chart image data representing a color chart containing a plurality of patches and causes the printer 20 to print the color chart based on the generated color chart image data. The controller 11 then generates the color chart image data described above representing the color chart described above in which the amounts of inks having the colors that belong to the first color group are fixed among the patches and the amount of ink having the specific color, which does not belong to the first color group, varies among the patches.

According to the configuration described above, the printer 20 prints the color chart containing the plurality of patches in which only the amount of the specific-color ink, out of the inks having the colors that belong to the first color group and the specific-color ink, varies. The user can therefore accurately and readily check the visual effect resulting from the difference in the amount of specific-color ink among the patches by viewing the printed color chart. As a result, the specific-color ink to be printed along with the inks having the colors that belong to the first color group can be appropriately adjusted.

According to the first and second embodiments, the controller 11 generates the color chart image data in which the amount of the specific-color ink described above to be printed as the undercoat for the inks that belong to the first color group on the print medium varies among the patches described above.

According to the configuration described above, viewing the printed color chart allows the user to check the effect of the undercoat according to the difference in the amount of specific-color ink among the patches.

The controller 11 causes the printer 20 to print the specific-color ink described above on the print medium based on the color chart image data described above and further causes the printer 20 to print the inks having the colors that belong to the first color group based on the color chart image data described above in the position where the specific-color ink described above has been printed on the print medium described above.

According to the first and second embodiments, the first color group contains CMYK, and the specific color as the undercoat described above is white.

It is expected by printing a white ink as the undercoat for CMYK inks to provide a color development effect of improving the development of the colors of the CMYK inks on the print medium and a color leakage suppression effect of suppressing of see-through colors from the CMYK inks via the rear side of the print medium. The user can therefore check the color development effect and the color leakage suppression effect according to the difference in the amount of white ink among the patches by viewing the printed color chart.

Further, an example in which the first color group contains CMYK and the specific-color ink is a metallic ink to be printed along with the CMYK inks in the mixed-color printing is disclosed in the second embodiment. That is, when the mixed-color printing is specified, the controller 11 causes the printer 20 to perform the mixed-color printing using the CMYK inks and the metallic ink based on the color chart image data generated in step S330. The mixed-color printing using the CMYK inks and the metallic ink allows a metallic shiny appearance to be imparted to the colors of the CMYK inks on the print medium. The user can therefore check the shiny appearance according to the difference in the amount of metallic ink among the patches by viewing the printed color chart.

5. Another Embodiment

Another aspect contained in the present embodiment will be described.

Figure 5:
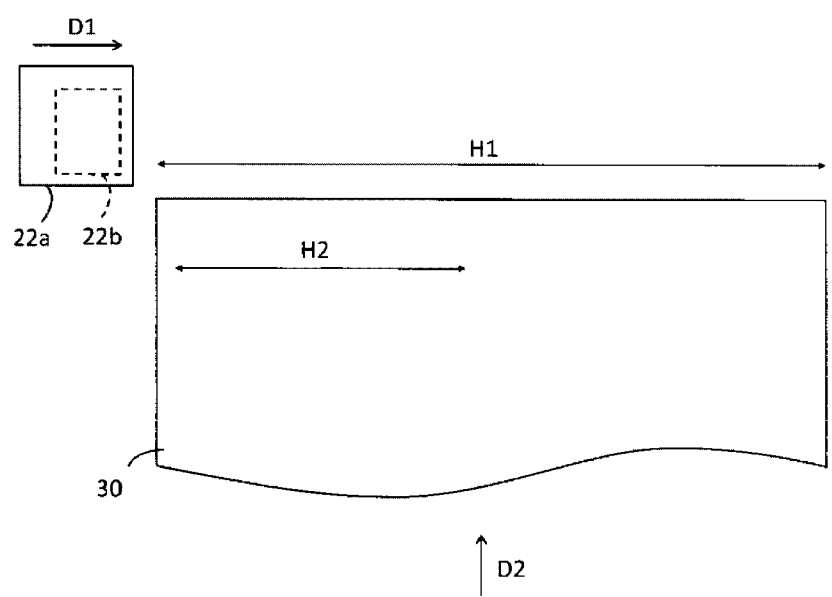
FIG. 5 shows part of the configuration of a printer and other portions in a simplified manner.

FIG. 5 shows part of the configuration of the printing mechanism 22 of the printer 20 and other portions in a simplified manner. As an example of the printing mechanism 22 when the printing is performed based on ink jetting, the printing mechanism 22 includes a print head 22b and a carriage 22a. The print head 22a includes a nozzle group that is not shown but capable of discharging the inks that belong to the first color group and the specific-color ink. The carriage 22a incorporates the print head 22b and moves in a primary scan direction D1 and in the direction opposite the primary scan direction D1. That is, the carriage 22a makes reciprocating movement along the primary scan direction D1. A print medium 30 is transported by the transporting mechanism 21 in a transportation direction D2, which intersects the primary scan direction D1. The print head 22b, which moves along with the carriage 22a, discharges inks onto the print medium 30 transported by the transporting mechanism 21 in each of the outward movement and the return movement of the carriage 22a. That is, referring to the example shown in FIG. 5, the controller 11 of the image processing apparatus 10 controls the printer 20, which performs printing by using the carriage 22a, which incorporates the ink-discharging print head 22b and makes reciprocating movement above the print medium 30 along a predetermined direction (primary scan direction D1).

The color chart expressed in the form of the color chart image data is not necessarily an image having a size large enough to be printed across the entire print medium 30, depending on the number of patches set in step S110 or S210. For example, a color chart containing about 9 patches P, such as that shown in FIG. 3, is printed in a partial area of the print medium 30. The reference character H2 in FIG. 5 shows an example of the width, in the primary scan direction D1, of the area where the color chart is printed on the print medium 30 based on the color chart image data generated in step S170, S290, or S330. As shown in FIG. 5, when the width of the area where the color chart is printed on the print medium 30 based on the color chart image data is the width H2 smaller than a width H1 of the print medium 30, the printer 20 may set the range containing the width H2 as the range over which the carriage 22a moves to print the color chart.

In a case where the range over which the carriage 22a moves to print the color chart is limited to the range necessary for the printing of the color chart, the condition on the printing of the color chart is undesirably likely to differ from the condition on intended printing. Intended printing is printing performed by reflecting, for example, adjustment of the amount of specific-color ink based on the result of the printing of the color chart in the print setting, for example, printing having a content desired by the user, such as printing of an advertisement poster. The intended printing is performed in many cases by using the entire or substantially the entire width H1 of the print medium 30 to effectively use the print medium 30. When the range over which the carriage 22a moves to print the color chart is limited to the range containing the width H2, and the range over which the carriage 22a moves to perform the following intended printing is then set to the range containing the width H1, the difference between the time when inks are discharged in the outward movement of the carriage 22a and the time when inks are discharged in the return movement thereof differs between the printing of the color chart and the intended printing. The time difference described above affects the period for which the ink discharged onto the print medium 30 dries. The ink drying period in the printing of the color chart therefore differs from that in the intended printing, and it is therefore undesirably difficult for the user who visually recognizes the result of the printing of the color chart to accurately predict the quality of an image to be produced in the intended printing.

To address the problem described above, the controller 11 may specify, in uncorrelation with the generated color chart image data, the range containing the width H1 of the print medium 30 in the primary scan direction D1 as the range over which the carriage 22a moves and cause the printer 20 to print the color chart. That is, to instruct the printer 20 to print the color chart based on the color chart image data in step S180 or S340, the controller 11 also issues an instruction indicating that the range over which the carriage 22a moves should be the range containing the width H1 of the print medium 30 irrespective of the size of the color chart expressed in the form of the color chart image data. As a result, even in the printing of a color chart so sized as to fall within the width H2 on the print medium 30, the carriage 22a makes reciprocating movement over the range containing the width H1 of the print medium 30 to print the color chart. The problem described above due to the difference in the ink drying period between the color chart printing and the intended printing can therefore be solved.

In the color chart printed in the present embodiment, the specific-color ink as the undercoat for the inks that belong to the first color group is not limited to a white ink. For example, the controller 11 may control the printer 20 in such a way that a metallic ink is printed as the undercoat described above. In this case, the user can check the visual effect according to the difference in the amount of metallic ink as the undercoat among the patches by viewing the printed color chart.

Further, the controller 11 may control the printer 20 as follows: A clear ink is set as the specific-color ink; an image layer printed with the inks that belong to the first color group is first printed in the color chart printing according to the present embodiment; and the clear ink is printed as an upper layer on the image layer. In this case, the user can check the visual effect according to the difference in the amount of clear ink as the upper layer among the patches by viewing the printed color chart.

What is claimed is:

1. An image processing apparatus comprising
  a processor that generates color chart image data representing a color chart containing a plurality of patches and causes a printing apparatus to print the color chart based on the generated color chart image data,
  wherein the processor generates the color chart image data representing the color chart in which amounts of recording agents having colors that belong to a first color group are fixed among the patches and an amount of a recording agent having a specific color that does not belong to the first color group varies among the patches,
  wherein the processor generates the color chart image data in which the amount of the recording agent having the specific color to be printed as an undercoat for the recording agents that belong to the first color group on a print medium varies among the patches.

2. The image processing apparatus according to claim 1, wherein the first color group contains cyan, magenta, yellow, and black, and the specific color is white.

3. The image processing apparatus according to claim 1, wherein the processor causes the printing apparatus to print the recording agent having the specific color on the print medium based on the color chart image data and further causes the printing apparatus to print the recording agents having the colors that belong to the first color group based on the color chart image data in a position where the recording agent having the specific color has been printed on the print medium.

4. The image processing apparatus according to claim 1,
wherein the processor controls the printing apparatus that performs printing by using a carriage that incorporates a print head that discharges ink as the recording agent and makes reciprocating movement above a print medium along a predetermined direction, and
the processor specifies, in uncorrelation with the generated color chart image data, a range containing a width of the print medium in the predetermined direction as a range over which the carriage moves and causes the printing apparatus to print the color chart.

5. A non-transitory recording medium that causes a computer to perform
a generation function of generating color chart image data representing a color chart containing a plurality of patches, and
a print control function of causing a printing apparatus to print the color chart based on the generated color chart image data,
wherein the generation function generates the color chart image data representing the color chart in which amounts of recording agents having colors that belong to a first color group are fixed among the patches and an amount of a recording agent having a specific color that does not belong to the first color group varies among the patches,
wherein the generation function generates the color chart image data in which the amount of the recording agent having the specific color to be printed as an undercoat for the recording agents that belong to the first color group on a print medium varies among the patches.

6. An image processing method comprising:
a generation process step of generating color chart image data representing a color chart containing a plurality of patches; and
a print control process step of causing a printing apparatus to print the color chart based on the generated color chart image data,
wherein the generation process step generates the color chart image data representing the color chart in which amounts of recording agents having colors that belong to a first color group are fixed among the patches and an amount of a recording agent having a specific color that does not belong to the first color group varies among the patches,
wherein the generation process step generates the color chart image data in which the amount of the recording agent having the specific color to be printed as an undercoat for the recording agents that belong to the first color group on a print medium varies among the patches.

* * * * *